United States Patent [19]

Stearns

[11] Patent Number: 4,872,603
[45] Date of Patent: Oct. 10, 1989

[54] INSERT INSTALLATION MACHINE
[75] Inventor: Ralph A. Stearns, Bozrah, Conn.
[73] Assignee: Spirol International Corporation, Killingly, Conn.
[21] Appl. No.: 245,753
[22] Filed: Sep. 16, 1988
[51] Int. Cl.[4] .......................................... H05K 13/04
[52] U.S. Cl. .................................... 227/97; 227/101; 227/103; 227/104; 227/116
[58] Field of Search .................... 227/93, 97, 101, 103, 227/104, 109, 116, 138; 29/739

[56] References Cited

U.S. PATENT DOCUMENTS

| | | | |
|---|---|---|---|
| 2,979,721 | 4/1961 | Helda | 227/97 |
| 3,485,432 | 12/1969 | Lagrasse et al. | 227/97 |
| 3,803,694 | 4/1974 | Hermann et al. | 227/97 |
| 3,982,679 | 9/1976 | White, Jr. | 227/116 |
| 4,385,719 | 5/1983 | Erskine | 227/116 |
| 4,519,534 | 5/1985 | White | 227/117 |

OTHER PUBLICATIONS

"Spirol Insert Drivers" reference including cover page and pages numbered 2-5.
"Bollnoff Heated Inserters" single page reference.

Primary Examiner—Donald R. Schran
Assistant Examiner—James L. Wolfe
Attorney, Agent, or Firm—Hayes & Reinsmith

[57] ABSTRACT

An insert installation machine is provided which features a power operated reciprocating quill mounted on a frame and an insert guide tube fixed to a carriage. The carriage is supported on the frame for reciprocation, toward and away from a workpiece, with the guide tube coaxially aligned with the quill. A shuttle is mounted on the carriage for transferring an insert from a stacking tube in the carriage to the guide tube in timed relation and in response to quill movements.

20 Claims, 3 Drawing Sheets

INSERT INSTALLATION MACHINE

FIELD OF THE INVENTION

This invention generally relates to a machine for installing an insert into a workpiece and specifically concerns such a machine particularly suited for the installation of metal inserts into a thermoplastics workpiece.

BACKGROUND OF THE INVENTION

Different industrial applications require insertion of various types of metal fasteners into thermoplastics components with high pull-out resistance, rotational resistance and resistance to vibration and back-out torque. An example of these known techniques is found in U.S. Pat. No. 4,488,672 assigned to the assignee of this invention entitled "Thermal Press Having Insert Driving Air Biasing Mechanism". This referenced patent discloses a readily adjustable press which insures consistent and uniform high quality installation of metal inserts into thermoplastics material under varying conditions. As is known, such thermoplastics workpieces are normally temporarily located in a fixed jig or other suitable device below the insertion mechanism.

In such applications it is particularly desirable to have an insertion mechanism which will provide for installation of inserts of workpieces of widely varying depth, thereby allowing an operator to place a workpiece below the inserter even with a so-called "deep" workpiece.

In such applications, it is also desireable to provide, if possible, for retraction of the movable parts of the installation equipment to permit movement and changing of the workpiece in a quick and easy manner.

Yet further problems which have been encountered in conventional insert installation equipment include complexity of design in known mechanisms which require multiple valving, logic timing and interlocks to a controller for sequencing and controlling independent motions of parts of the installation equipment and yet further complexities introduced by critical design features such as bearings for such equipment providing for insert installation having close tolerances.

Accordingly, it is an object of this invention to provide a new and improved machine for the installation of inserts into a workpiece which machine is of a significantly simplified design providing consistent quality and reliability, reduced cost in its manufacture and trouble-free operation under normal production conditions.

Another object of this invention is to provide for such a machine wherein a multiplicity of independent motions are controlled by a single reciprocating stroke of an operating cylinder to effect insert installation into a workpiece and return of the machine components at the end of the cycle in readiness for the next operating cycle.

A further object of this invention is to provide such a machine which is particularly suited for a simplified control whereby even a single control may be used to control the operation of the machine while eliminating conventional requirements for normal sequencing controls.

Yet another object of this invention is to provide a machine of the type described featuring controlled guidance of inserts during insertion by an extensible and retractable insert guide tube which allows clearance for workpiece movement or removal between strokes.

A yet further object of this invention is the provision of such a machine which effects a positive drive in opposite directions of reciprocation of the main operating components to minimize binding and to provide continuous drive control of the operating components.

Other objects will be in part obvious and in part pointed out in more detail hereinafter.

SUMMARY OF THE INVENTION

This invention is directed to a machine for installing an insert into a workpiece and comprising a frame, a quill for applying an insert driving force to drive the insert into the workpiece, the quill being mounted on the frame for reciprocation toward and away from the workpiece between a retracted starting position and a fully extended position, an insert guide tube supported on the frame in coaxial alignment with the quill for reciprocating movement between a retracted ready position and an extended operating position, and a shuttle having an aperture, the shuttle being movable relative to the frame between an insert loading position, wherein the aperture is displaced in offset relation to the quill for receiving the insert, and an insert installing position, wherein the aperture is coaxially aligned with both the quill and the insert guide tube, the quill being engageable in positive driving relation to the shuttle upon movement of the quill toward the workpiece to move the shuttle from its insert loading position to its insert installing position and simultaneously therewith to move the insert guide tube from its retracted ready position to its extended operating position.

A better understanding of the objects, advantages, features, properties and relationships of the invention will be obtained from the following detailed description and accompanying drawings which set forth an illustrative embodiment and is indicative of the ways in which the principles of this invention are employed.

DESCRIPTION OF A PREFERRED EMBODIMENT

Figure 3:
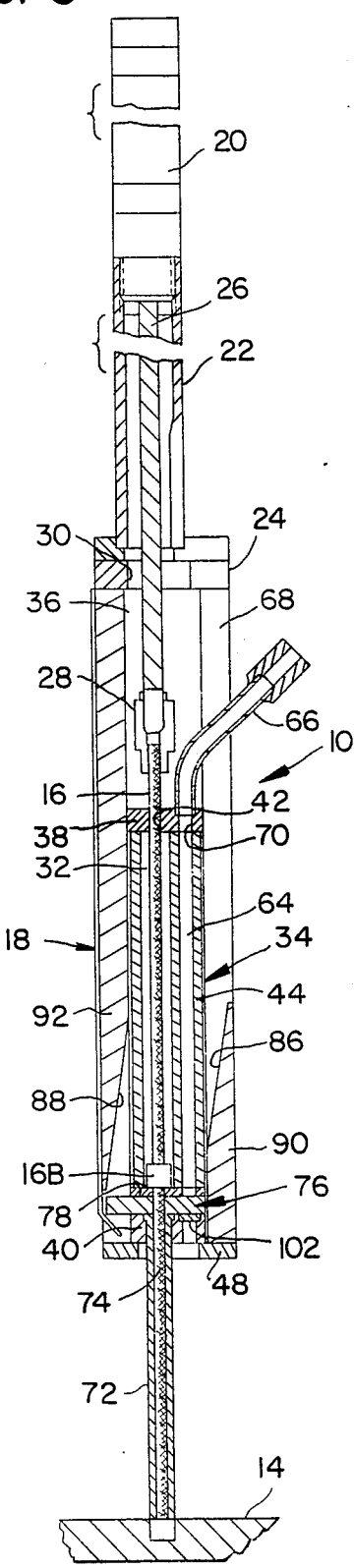
FIG. 3 is a side view, similar to FIGS. 1 and 2, partly broken away and partly in section, showing the machine at a fully extended position of an operating stroke.

Referring now to the drawings in detail, a machine generally designated 10 will be understood to be mounted on a stand, not shown, having a mounting bracket 12 (FIGS. 4 and 5) maintaining the machine in its illustrated upright vertical position relative to a workpiece 14. A quill 16 is supported for reciprocable movement within a housing assembly or frame 18 of the machine along a generally vertical axis between upper and lower stroke limit positions illustrated respectively in FIGS. 1 and 3.

To move the quill 16 between its stroke limit positions, a conventional double acting pneumatic cylinder 20 is shown mounted on a cylinder support tube 22 suitably secured to a cover plate 24 of frame 18. Frame 18 is elongated and generally rectangular in cross-section. The cylinder 20 will be understood to be of known design suited to be connected to a source of pressurized air, not shown. Cylinder 20 has conventional supply and exhaust ports and an extensible and retractable piston rod 26 projecting from cylinder 20 into support tube 22. Rod 26 may be connected in any suitable manner, such as with the illustrated threaded fitting 28 to quill 16 which extends in coaxial alignment with piston rod 26 through the support tube 22 and through an opening 30 in cover plate 24 of frame 18.

The quill 16, which can be varied in diameter and length to accommodate different insertion requirements of the machine, has a driving tip 16A (FIG. 5) for applying a driving force for insertion of an insert (not shown) into workpiece 14 and a collar 16B of enlarged diameter intermediate the length of the quill. A portion of quill 16 extends downwardly beyond the collar 16B and is received within a chamber of a carriage 34 which in turn is received for reciprocating movement within a compartment 36 extending longitudinally along the length of frame 18. Accordingly, carriage 34 is received for reciprocation within compartment 36 of frame 18 and the quill 16 itself is in turn movable relative to carriage 34 within its chamber 32.

Figure 1:
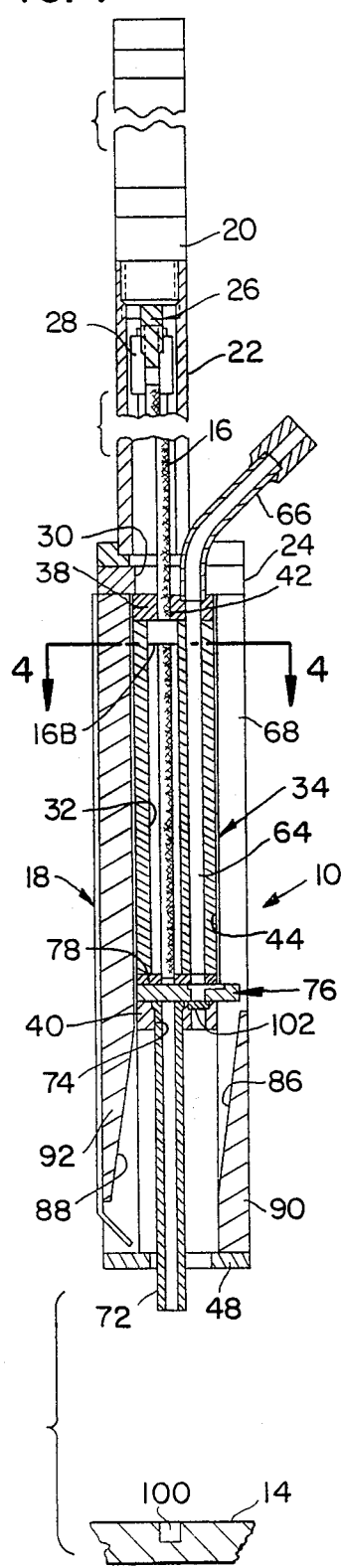
FIG. 1 is a side view, partly broken away and partly in section, showing a machine incorporating this invention for installing an insert into a workpiece wherein the machine is depicted in readiness for the start of an operating cycle.
Figure 2:
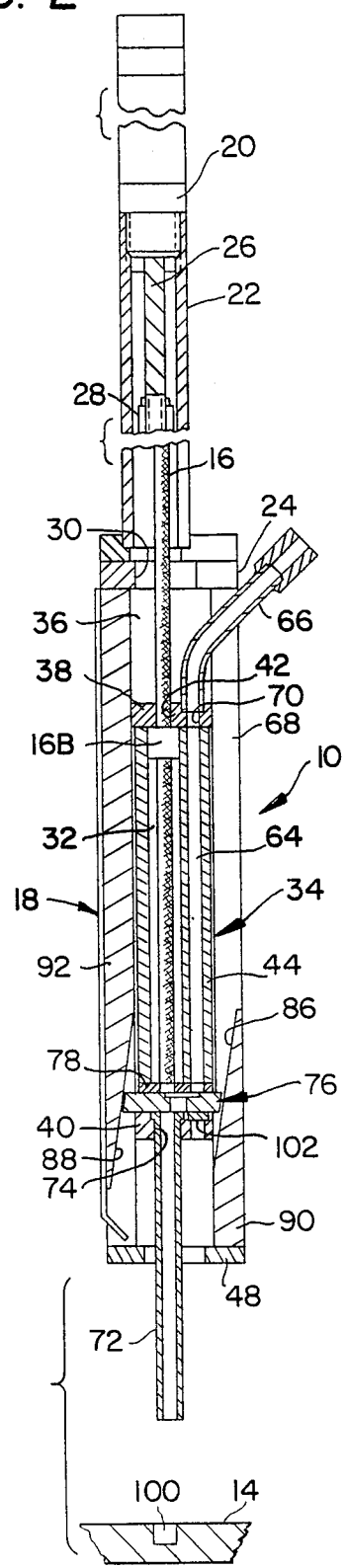
FIG. 2 is a side view, partly broken away and partly in section, of the machine of FIG. 1 wherein the machine is shown in intermediate position during an operating stroke of the machine.
Figure 4:
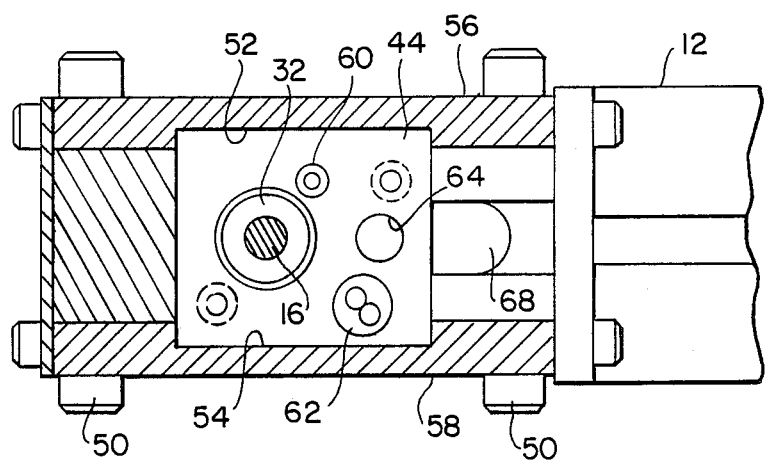
FIG. 4 is an enlarged view, partly broken away and partly in section, taken generally along line 4—4 of FIG. 1.
Figure 5:
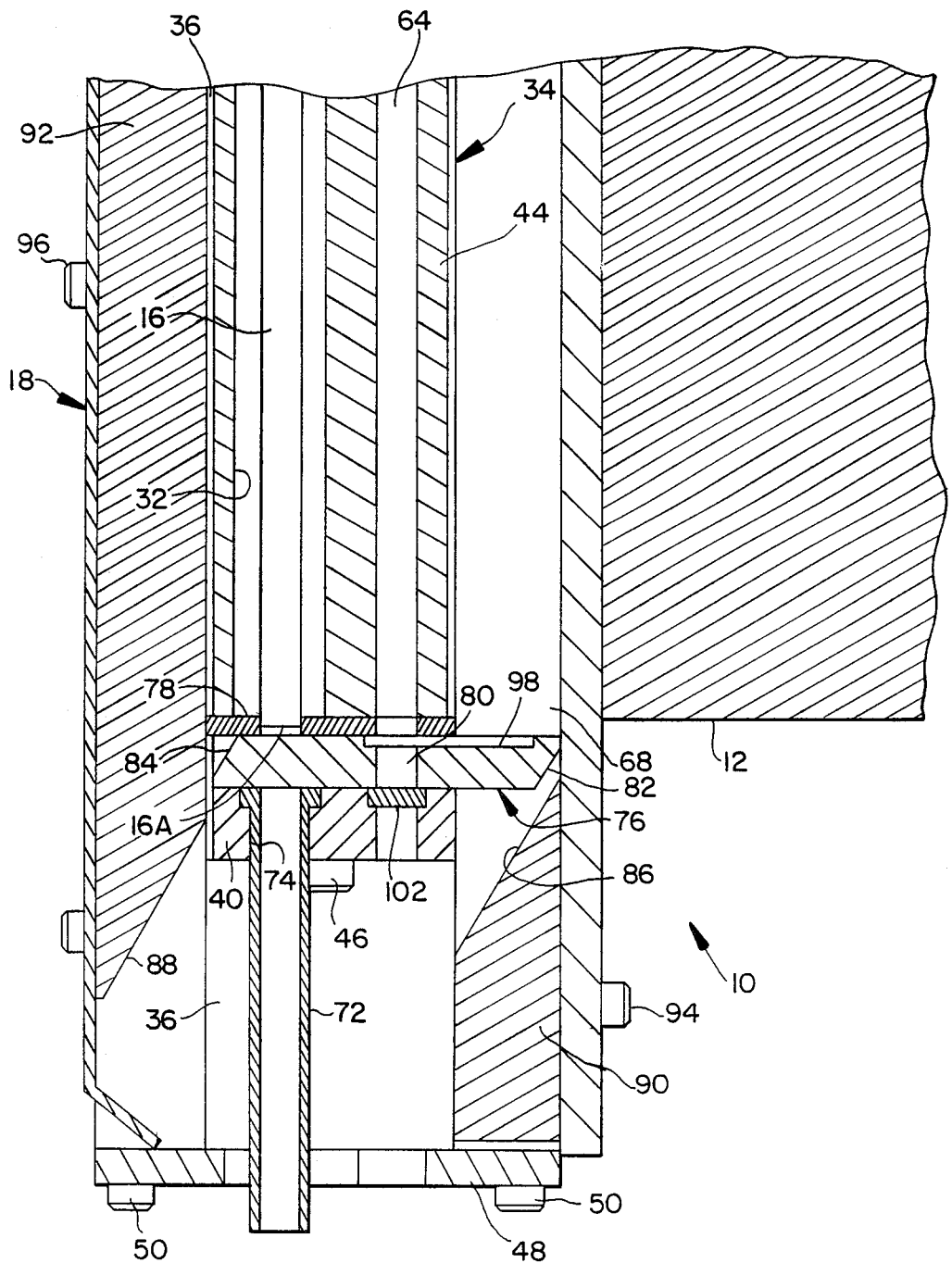
FIG. 5 is an enlarged side view, partly broken away and partly in section, showing details of certain components of the machine of FIG. 1.

The carriage 34 has first and second end blocks 38, 40 at its opposite longitudinal ends. The first or upper end block 38 has an opening 42 therethrough for accommodating the quill. Its collar 16B is received within chamber 32 of carriage 34 is shown in FIGS. 1 and 2 in engagement with the lower surface of the upper end block 40. The second or lower end block of carriage 34 is secured to main block 44 of carriage 34 by any suitable means such as illustrated fastener. Upper and lower stroke limit positions of carriage 34 may be established by engagement of upper end block 38 with cover plate 24 of frame 18 and engagement of lower end block 40 with an apertured bottom stop plate 48 suitably fixed to the base of frame 18 by fasteners such as at 50 (FIG. 5). Alternatively, the upper stroke limit position may be established by the cylinder stroke. As best seen in FIG. 4, block 44 of carriage 34 is of generally rectangular cross-section and is received for linear sliding movements within channels 52, 54 formed in opposite side plates 56, 58 of frame 18.

In accordance with one aspect of this invention, the carriage block 44 has a thermocouple 60 and an electrical resistance cartridge heater 62 which are electrically connected and controlled in a well known manner for selectively heating block 44 to a predetermined temperature. Block 44 is formed of a material of high thermal conductivity, thus providing means for selectively establishing a desired installation temperature for inserts stacked within a longitudinally extending stacking tube 64 formed within block 44. The inserts may be fed by any suitable means such as a conventional vibratory feeder (not shown) into a flexible feed tube 66 connected through side slot 68 of frame 18 to an opening 70 in upper end block 38 of carriage 34 which registers with stacking tube 64 for receiving inserts, the flexible feed tube 66 being thus integral and reciprocable with carriage 34 relative to frame 18.

For controlled guidance of each insert upon its being individually driven into workpiece 14, an insert guide tube 72 is fixed within an opening 74 in the lower end block 40 of carriage 34 in coaxially aligned relation to quill 16. By virtue of this construction, carriage reciprocation automatically and in unison reciprocates insert guide tube 72 whereby it may be fully retracted at the end of one machine cycle (and prior to commencement of a subsequent cycle) for ready removal of a workpiece below the machine or for changing the position of that workpiece preliminary to the next machine cycle.

To provide a simplified design utilizing a minimum number of parts which further minimizes cycling control, a shuttle 76 is supported in carriage 34 for lateral movement between a fixed guide plate 78 and lower end block 40. These lateral movements of shuttle 76, coupled with vertical or longitudinal movements of carriage 34, effect shuttle movement between an insert loading position (FIGS. 1 and 5), wherein an insert aperture 80 (FIG. 5) of shuttle 76 is positioned for receiving an insert at the bottom of the stacking tube 64, and an insert installing position (FIG. 3), wherein insert aperture 80 is coaxially aligned with both the quill 16 and insert guide tube 72. To effect such shuttle movements, opposite ends of shuttle 76 are suitably beveled to form cam follower surfaces 82, 84 which are configured to match inclined cam surfaces 86, 88 formed on lower and upper cam blocks 90, 92 suitably secured in fixed relation to frame 18 such as by fasteners 94, 96.

More specifically, shuttle 76 is illustrated as having a shallow cavity 98 (FIG. 5) formed in its upper surface in communication with the insert aperture 80 and insert stacking tube 64 of carriage 34 such that, upon movement of shuttle from its insert loading position (FIG. 1) toward its insert installing position (FIG. 3), an insert received within shuttle aperture 80 is transferred from a position aligned with the insert stacking tube 64 into an operative installation condition wherein the insert aperture 80 and the insert therein are both registered in alignment with insert guide tube 72 in its extended operating position (FIG. 3) and quill 16. During such movement as shuttle 76 is laterally and longitudinally moved simultaneously along the upper and lower cam tracks 88, 86 of frame 18, the lowermost insert within aperture 80 of shuttle 76 is sheared from the insert stack within the overlying tube 64 upon downward movement of carriage 34 (FIG. 2) toward workpiece 14.

To provide a positive carriage drive in accordance with this invention, quill 16 is in adjacent but disengaged relation to shuttle 76 in its insert loading position (FIGS. 1 and 5). Upon activation of the pneumatic cylinder 20 to drive piston rod 26 and quill 16 downwardly, tip 16A of quill 16 moves a discrete distance downwardly through an opening in guide plate 78 and (FIG. 5) into driving engagement with the upper surface of shuttle 76 whereby the shuttle, insert guide tube 72 and entire carriage 34 are simultaneously driven downwardly as a unit in positive fashion in unison with movement of quill 16 toward workpiece 14 until the lower end block 40 of carriage 34 bottoms against stop plate 48 of frame 18 to establish the extended operating position of guide tube 72. This guide tube position normally will be adjacent a preformed hole such as at 100 in workpiece 14 with a limited clearance of, say 1/30th of an inch.

It will be seen that such linear shuttle movement is comprised of simultaneous lateral and parallel components of movement relative to the linear movement of quill 16 and insert guide tube 72. Once shuttle 76 thus has moved across into insert installing position (FIG. 3.) and the insert nested in insert aperture 80 of shuttle 76 is aligned with insert guide tube 72, quill 16 under the continued driving control of piston rod 26 drives the insert down through the guide tube 72 into the workpiece to a predetermined depth.

Such construction provides for a positive drive by quill 16 against the top of shuttle 76 with gravity assistance to minimize any possibility of binding of the parts during operation and accelerates the speed of the shuttle in contrast to a straight gravity feed. The quill 16 also moves at a speed sufficiently fast to be greater than the speed of insert free fall under the force of gravity through the guide tube 72 to ensure continuous control of the insert. The heat from the preheated insert melts the thermoplastic material locally, whereupon molten plastic conforms around the insert, thus holding the insert firmly in place. Such inserts are desirably formed of metal such as brass and typically have durable internal threads allowing screws, e.g., to be assembled and disassembled repeatedly without damaging the internally threaded insert.

As will be appreciated by those skilled in the art, the disclosed construction is readily adapted for interchanging quills and insert guide tubes of different diameter and length for applications of various insert sizes and shapes. In addition, the operating cycle time for a given insert installation may vary depending upon the type of thermoplastics utilized in the workpiece, the size of the insert, the heat sink temperature and applied insert installation pressure.

To return carriage 34 and shuttle 76 to a starting position wherein the insert guide tube 72 is moved from its extended operating position (FIG. 3) into its retracted ready position (FIG. 1) simultaneously with shuttle return from its insert installing position (FIG. 3) to its insert loading position (FIG. 1), the air supply and exhaust connections to the pneumatic cylinder 20 are reversed. Such action drives the piston rod 26 in an opposite upward direction, thereby raising the quill 16 from its fully extended position (FIG. 3) relative to the carriage 34 until collar 16B of quill 16 engages upper end block 38 of carriage 34. Tip 16A of quill 16 thus is in raised disengaged relation to the upper surface of shuttle 76 to provide clearance therewith whereupon continued upward movement of the piston rod 26 and quill 16 positively drives the carriage 34 including its insert guide tube 72 and shuttle 76 upwardly until the stroke limit position of quill 16 is reached as established by engagement of the upper end block 38 of the carriage 34 with the frame cover plate 24. Thus, shuttle 76 is then returned into its insert loading position, the insert guide tube 72 is returned into its retracted ready position, and the quill 16 is returned into its retracted starting position in readiness for the next machine cycle.

At this point, a lowermost insert in the stacking tube 64 within the carriage 34 will drop into the insert aperture 80 of the shuttle 76 with the upper surface of the insert located below the upper plane of the shuttle 76. During shuttle reciprocation, the oversized configuration of the shallow shuttle cavity 98 relative to aperture 80 permits the next insert to take a partial "step" drop onto upper surface 98 of the shuttle without jamming or shearing. In the event that such jamming were to occur, it may be readily rectified by removal of an escapement slide 102 shown located below the insert aperture 80 between the lower surface of the shuttle 76 and the lower end block 40 of carriage 34, it being understood that escapement slide 102 may be simply removed by pulling it out through an opening (not shown) in the side plate of frame 18.

By virtue of the above construction, the described simplified machine design features minimize many problems which may be otherwise encountered during extended production operations and additionally enhance the reliability of such insertion production. The reciprocating insert guide tube 72 provides retraction of that tube to minimize unnecessary movements of the underlying workpiece and allows an operator to place the workpiece below the machine even with relatively "deep" workpieces. In addition, the coaxially in-line arrangement of the drive mechanism, quill and insert guide tube, when coupled with the simplified shuttle arrangement disclosed in this invention, permits all described independent motions of the components to be provided by one reciprocating movement of the piston rod 2G. I.e., insertion, shuttle action and insert guide tube extension and retraction are provided by the single pneumatic drive cylinder 20. The disclosed simplified design and its advantages are particularly well suited for a single cycling control of the pneumatic cylinder for complete cycling of the machine in contrast to logic timing controls, interlocks and other programmable sequencing requirements of conventional machines.

As will be apparent to persons skilled in the art, various modifications, adaptions and variations of the foregoing specific disclosure can be made without departing from the teachings of the present invention.

I claim:

1. A machine for installing an insert into a workpiece and comprising a frame, a quill for applying an insert driving force to drive the insert into the workpiece, the quill being mounted on the frame for reciprocation toward and away from the workpiece between a retracted starting position and a fully extended position, an insert guide tube supported on the frame in coaxial alignment with the quill for reciprocating movement between a retracted ready position and an extended operating position, and a shuttle having an aperture, the shuttle being supported on the frame for movement between an insert loading position, wherein the aperture is displaced in offset relation to the quill for receiving the insert, and an insert installing position, wherein the aperture is coaxially aligned with both the quill and the insert guide tube, the quill being engageable in positive driving relation to the shuttle upon movement of the quill toward the workpiece to move the shuttle from its insert loading position to its insert installing position and simultaneously therewith to move the insert guide tube from its retracted ready position to its extended operating position.

2. The machine of claim 1 wherein the quill and insert guide tube movements are reciprocable toward and away from the workpiece along a common axis, and wherein the frame and shuttle include cam and cam follower means for supporting the shuttle on the frame for reciprocating linear movements between said insert loading and installing positions.

3. The machine of claim 2 wherein said linear shuttle movements have simultaneous lateral and parallel components of movement relative to the reciprocating movements of the quill and insert guide tube.

4. The machine of claim 1 wherein the shuttle insert aperture is laterally offset and spaced apart from the coaxially aligned quill and insert guide tube when the shuttle is in its insert loading position, and wherein the quill in its retracted starting position is in discretely spaced adjacent relation to the shuttle whereby, after an initial movement of the quill from its retracted starting position toward the workpiece, the quill positively engages the shuttle to drive the shuttle from its insert loading position to its insert installing position.

5. The machine of claim 1 wherein the quill moves toward its fully extended position independently of the shuttle and insert guide tube upon their being positioned in their respective insert installing position and extended operating position for driving the insert through the guide tube into the workpiece.

6. The machine of claim 1 further including an elongated carriage supported for linear reciprocation on the frame and having a first end block and a second end block at opposite longitudinal ends of the carriage, the insert guide tube mounted on the carriage in integrally fixed relation to its second end block and extending beyond its second end block toward the workpiece, the shuttle being mounted on the carriage for movement between said shuttle insert loading and installing positions.

7. The machine of claim 6 wherein the quill has a collar adjacent the first end block of the carriage, wherein the frame includes a stop plate, and wherein the second end block of the carriage engages the stop plate for establishing the extended operating position of the insert guide tube.

8. The machine of claim 7 wherein the collar of the quill, upon quill movement away from the workpiece from said fully extended position of the quill toward its retracted starting position, engages the first end block of the carriage, the quill upon engagement with said first end block being in discretely spaced disengaged relation to the shuttle and, upon continued quill movement toward its retracted starting position, the quill positively drives the carriage and insert guide tube to return into its retracted ready position and causes the shuttle to move into its insert loading position.

9. The machine of claim 6 wherein the workpiece is of thermoplastics material, wherein the carriage includes insert stacking means in communication with the shuttle aperture, a heat transfer block in surrounding relation to the stacking means, and heating means located in the heat transfer block for preheating inserts received in the stacking means prior to each insert being driven into the workpiece by the quill.

10. The machine of claim 1 further including power cylinder means having a linearly reciprocating piston rod drivingly connected to the quill.

11. The machine of claim 10 wherein the piston rod, quill and insert guide tube are coaxially aligned.

12. The machine of claim 1 wherein the quill in its retracted starting position is adjacent but spaced apart from the shuttle in disengaged relation thereto when the shuttle is in its insert loading position.

13. The machine of claim 1 wherein one of the shuttle and frame members includes cam follower means, and wherein the other of said members includes cam means for engaging the cam follower means and guiding the shuttle between its insert loading position and insert installing position.

14. The machine of claim 13 wherein the shuttle aperture in said insert loading position of the shuttle is laterally and longitudinally offset relative to its insert installing position, the shuttle insert aperture in said insert installing position being in coaxially aligned registration with the quill and insert guide tube.

15. The machine of claim 13 wherein the cam means and cam follower means are each formed by of linear surfaces to effect linear shuttle movements.

16. The machine of claim 1 wherein the shuttle upon being moved into its insert installing position is disposed between the quill and the insert guide tube.

17. The machine of claim 16 wherein the quill is intermediate its retracted starting position and fully extended position when the shuttle initially reaches its insert installing position and the insert guide tube is in its extended operating position.

18. The machine of claim 1 further including stop means on the frame for arresting movement of the insert guide tube to establish its extended operating position.

19. The machine of claim 18 wherein the quill drives the shuttle and insert guide tube in unison into an operative installation condition with the insert aperture of the shuttle in its insert installing position being registered in alignment with the insert guide tube in its extended operating position.

20. The machine of claim 19 wherein the quill moves toward its fully extended position independently of the shuttle and insert guide tube when they are disposed in said operative installation condition for positively driving an insert through the insert guide tube for insertion into the workpiece.

* * * * *